United States Patent [19]

Lee

[11] Patent Number: 5,802,035
[45] Date of Patent: Sep. 1, 1998

[54] OPTICAL PICKUP APPARATUS COMPATIBLE WITH DISKS OF VARIOUS FORMATS

[75] Inventor: Yong-Jae Lee, Uiwang, Rep. of Korea

[73] Assignee: Samsung Electronics Co., Ltd., Kyungki-Do, Rep. of Korea

[21] Appl. No.: 763,723

[22] Filed: Dec. 11, 1996

[30] Foreign Application Priority Data

Jan. 30, 1996 [KR] Rep. of Korea ............... 1996-2082

[51] Int. Cl.$^6$ ............................................. G11B 7/00
[52] U.S. Cl. ............................................ 369/112; 369/58
[58] Field of Search ............................ 369/112, 58, 103, 369/109, 44.26, 44.23

[56] References Cited

U.S. PATENT DOCUMENTS

| | | | |
|---|---|---|---|
| 5,235,581 | 8/1993 | Miyagawa et al. | 369/58 |
| 5,278,817 | 1/1994 | Maeda et al. | 369/112 |
| 5,303,221 | 4/1994 | Maeda et al. | 369/112 |
| 5,446,565 | 8/1995 | Komma et al. | 369/112 |
| 5,587,981 | 12/1996 | Kamatani | 369/58 |

FOREIGN PATENT DOCUMENTS 943007179  10/1994  European Pat. Off. .

*Primary Examiner*—Tan Dinh
*Attorney, Agent, or Firm*—Sughrue, Mion, Zinn, Macpeak & Seas, PLLC

[57] ABSTRACT

An optical pickup apparatus compatible with disks having different thicknesses is provided. The optical pickup apparatus includes an optical source, a beam splitter for changing the direction of the incident beam, an objective lens which is located between the optical source and the disk for focusing the incident beam to form an optical spot on the disk, and a photodetector for detecting information and error signals by receiving the beam which is reflected from the disk and passed through the beam splitter. A hologram optical element (HOE) is provided between the beam splitter and the photodetector for diffracting the beam reflected from the disk into a zero-order beam and a positive first-order beam. The photodetector includes a first photodetector and a second photodetector which receive the zero-order beam and the positive first-order beam, respectively.

10 Claims, 4 Drawing Sheets

5,802,035

OPTICAL PICKUP APPARATUS COMPATIBLE WITH DISKS OF VARIOUS FORMATS

BACKGROUND OF THE INVENTION

The present invention relates to an optical pickup apparatus, and more particularly, to an optical pickup apparatus compatible with disks having different formats.

Generally, optical pickups are employed in compact disk players (CDP), digital video disk players (DVDP), CD-ROM drives, DVD-ROM drives and the like, to record and reproduce information on and from the recording disks.

The optical pickup apparatus employed in the DVDP and DVD-ROM, which can record and reproduce high density video and audio signals, should preferably be able to use a CD as well as a DVD as a recording medium.

However, the standard thickness of a DVD is different from that of the CD family. Therefore, different considerations are applicable regarding allowable error in the mechanical inclination of the disk and the numeric aperture of the objective lens in the optical pickup apparatus. That is, the thickness of the conventional CD family is 1.2 mm while that of the DVD is 0.6 mm. Due to the difference in thickness, spherical aberration occurs when an optical pickup apparatus for the DVD is used for the CD family. Consequently, it is impossible to obtain a sufficient amount of light for recording information and the reproduced signal is deteriorated by the spherical aberration.

A conventional compatible optical pickup apparatus developed for solving the above problems will be described with reference to FIG. 1.

As shown in FIG. 1, an optical source 11, such as a semiconductor laser, emits a laser beam 1. An objective lens 19 converges the incident beam 1 to form a beam spot on the recording surface of a disk 10. A beam splitter 15, located on the optical path between the optical source 11 and the objective lens 19, passes the beam emitted from the optical source 11 straight to the objective lens 19, and reflects the beam being incident from the objective lens 19 toward a photodetector 23. A hologram optical element (HOE) 17, located on the optical path between the objective lens 19 and the beam splitter 15, diffracts the incident beam 1 into a zero-order beam 3 and positive first-order beam 5. The zero-order beam 3 continues straight with respect to the incident beam 1 and the positive first-order beam 5 is diverged. Thus, the zero-order beam 3 and the positive first-order beam 5 pass through different portions of the objective lens 19, forming spots on different portions of the disk 10. The zero-order beam 3 is used for a relatively thin disk such as a DVD and the positive first-order beam 5 is used for a relatively thick disk such as a CD. The photodetector 23 receives the light reflected from the recording surface of the disk 10, to thereby detect a radio frequency information signal, a track error signal, and a focus error signal.

Also, the optical pickup apparatus further includes a grating 25, which is located between the optical source 11 and the beam splitter 15, for diffracting the incident beam 1. A collimating lens 13, is placed between the beam splitter 15 and the HOE 17 for collimating the divergent beam. The astigmatism lens 21 is for forming a circular or elliptical optical spot on the photodetector 23 according to the distance between the objective lens 19 and the disk 10.

In the operation of the optical pickup apparatus having the above structure, a beam emitted from the optical source 11 is diffracted into the zero-order beam 3 and the positive first-order beam 5 by the HOE 17, and is then converged by the objective lens 19, thereby forming an optical spot on the disk 10. When the disk 10 is relatively thin, such as a DVD, information is recorded and reproduced using the zero-order beam 3. When the disk 10 is relatively thick, such as a CD, information is recorded and reproduced using the positive first-order beam 5. That is, either the zero-order beam 3 or the positive first-order beam 5 is focused on the disk 10, so that the amount of beam focused on the disk 10 is only half of the beam 1 emitted from the optical source 11. In addition, due to various losses, the amount of beam received by the photodetector 23 is decreased to about 25% of the incident beam 1.

SUMMARY OF THE INVENTION

To solve the above problems, it is an object of the present invention to provide an optical pickup apparatus compatible with various format disks and which has an improved optical efficiency.

To achieve the above objects, there is provided an optical pickup apparatus including an optical source, a beam splitter for changing the direction of the incident beam, an objective lens which is located between the optical source and the disk for focusing the incident beam to form an optical spot on the disk, and a photodetector for detecting information and error signals by receiving the beam which is reflected from the disk and passed through the beam splitter. The optical pickup apparatus further comprises a hologram optical element (HOE), which is located between the beam splitter and the photodetector, for diffracting the beam reflected from the disk into a zero-order beam and a positive first-order beam. The photodetector is implemented using two photodetectors which individually receive the zero-order beam and the positive first-order beam, respectively.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
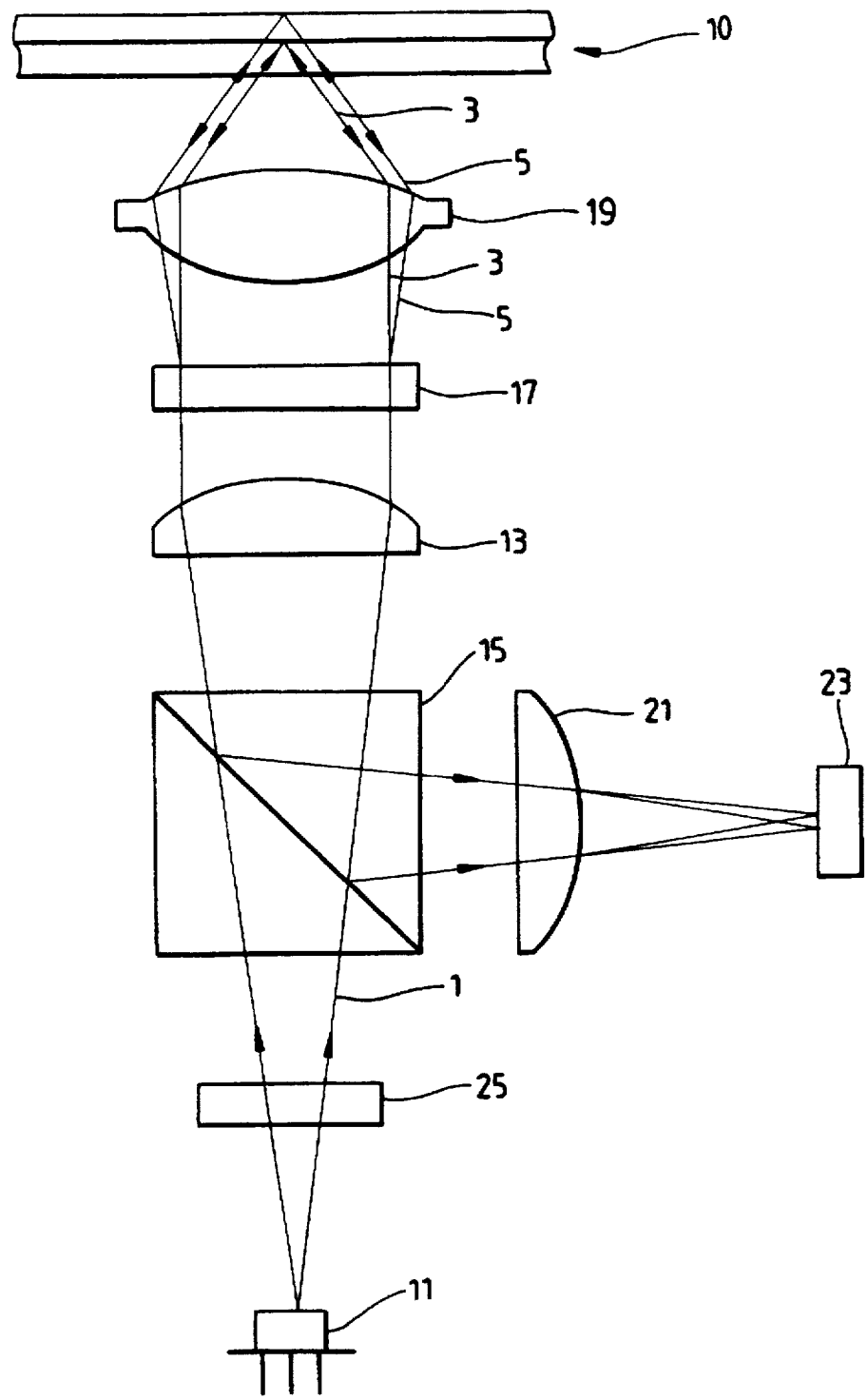
FIG. 1 is a diagram showing the optical structure of a conventional compatible optical pickup apparatus.
Figure 2:
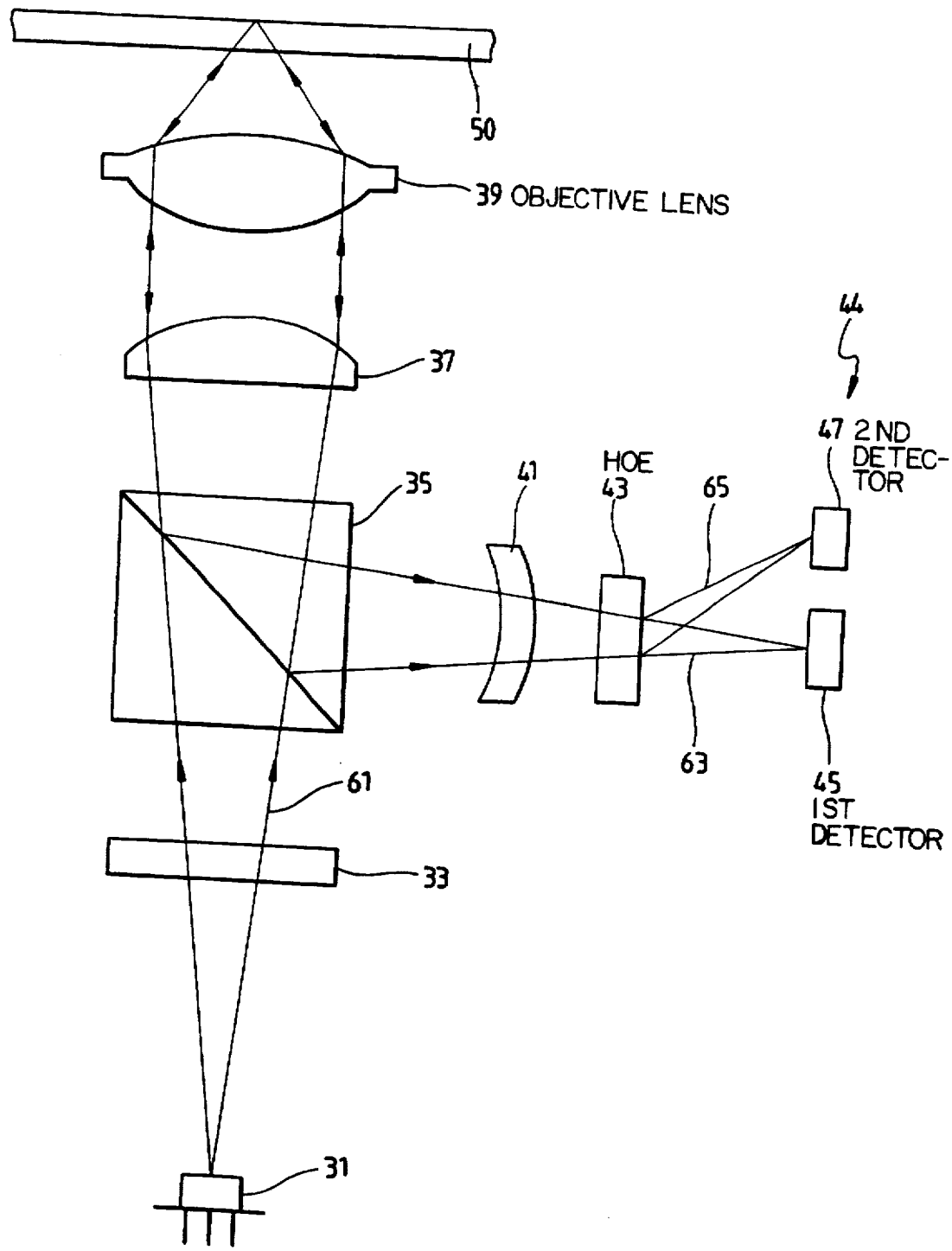
FIG. 2 is a diagram showing the optical structure of a compatible optical pickup apparatus according to the present invention.

Shown in FIG. 2 is a compatible optical pickup apparatus according to a preferred embodiment of the present invention. According to this embodiment, optical source 31 emits light beam 61. A beam splitter 35 changes the path of an incident beam 61 and an objective lens 39 focuses the incident beam 61 to form an optical spot on a disk 50. A photodetector 44 detects information and error signals by receiving the beam which is reflected from the disk 50, and then passed through the beam splitter 35. A hologram optical element (HOE) 43 is disposed between the beam splitter 35 and the photodetector 44.

The optical source 31 emits a laser beam having a short wavelength of about 650 nm. The objective lens 39 has a numeric aperture of about 0.6 which is suitable to be used for a relatively thin disk such as a DVD.

The HOE 43 diffracts the reflected light into a zero-order light 63 for a DVD and positive first-order beam 65 for a CD. The HOE 43 has a pattern for forming the positive first-order beam 65 as an abnormal spherical wave having an inverse spherical aberration when the incident beam is an ideal spherical wave, and for forming the positive first-order beam 65 as an ideal spherical wave when the incident beam is an abnormal spherical wave. Here, the pattern of the HOE 43 is formed using a well-known method.

Figure 3:
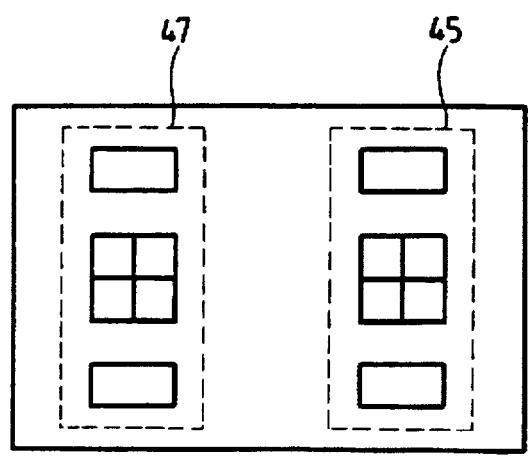
FIG. 3 is a diagram showing the first and second photodetectors of the compatible optical pickup apparatus shown in FIG. 2 according to the present invention.

The photodetector 44 is constituted by a first photodetector 45 and a second photodetector 47 which are arranged near each other, wherein the first photodetector 45 receives the zero-order beam 63 and the second photodetector 47 receives the positive first-order beam 65. As shown in FIG. 3, preferably, the first and second photodetectors 45 and 47 are formed of six divided plates, respectively, wherein four divided plates are for detecting an information signal and a focus error signal, and two divided plates, one located above and the other below the four divided plates, are for detecting a track error signal.

Also, the compatible optical pickup apparatus of the present invention may further include a grating 33 and a collimating lens 37 which are located on an optical path between the optical source 31 and the objective lens 39, and an astigmatism lens 41 placed between the first and second photodetectors 45 and 47 and the beam splitter 35.

The operation of the compatible optical pickup apparatus according to the present invention will be described in each case where a DVD and a CD formats are adopted, respectively.

Figure 4:
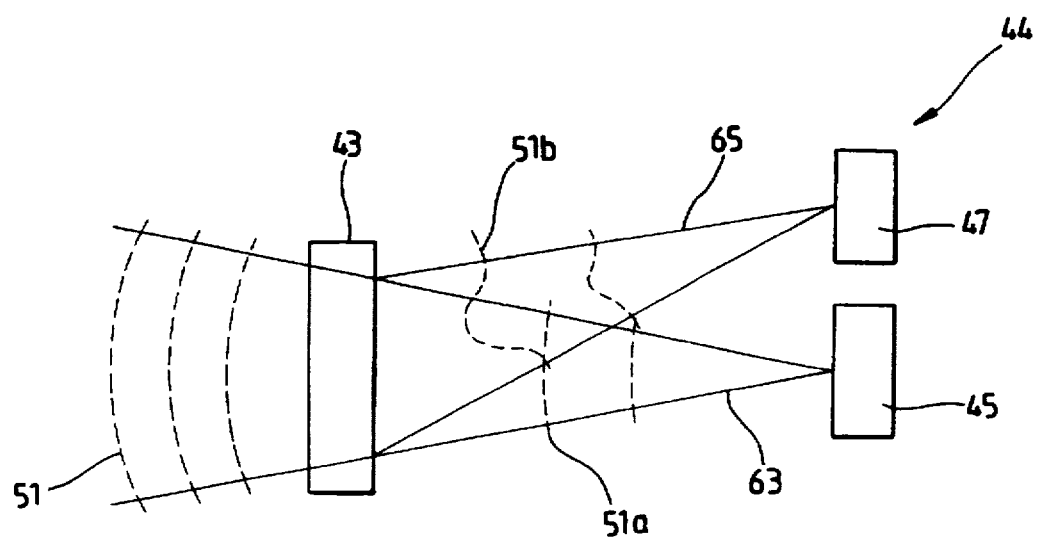
FIG. 4 is a diagram showing the operational state of the optical pickup apparatus according to the present invention when a comparatively thin disk is adopted.

First, the operation of the compatible optical pickup apparatus when the disk 50 is of the DVD format will be described with reference to FIGS. 2 and 4.

Since the optical source 31 is suitable for reproducing the signal recorded on the DVD, the beam reflected from the DVD becomes an ideal spherical wave. The beam reflected from the DVD is incident on the HOE 43 via the beam splitter 35. The HOE 43 diffracts the incident beam into the zero-order beam 63 and the positive first-order beam 65. Here, the zero-order beam 63 is maintained as an ideal spherical wave 51a (FIG. 4), which is the same as the incident beam, and the positive first-order beam 65 is changed to an abnormal spherical wave 51b by the pattern of the HOE 43. In this case, the signal recorded on the DVD is reproduced using the first photodetector 45.

Figure 5:
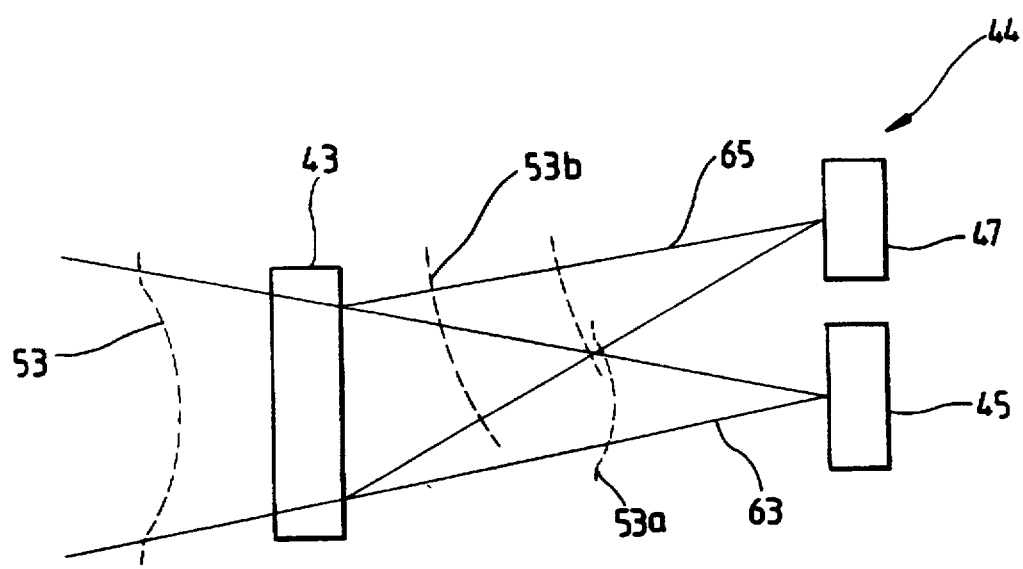
FIG. 5 is a diagram showing the operational state of the optical pickup apparatus according to the present invention when a comparatively thick disk is adopted.

Next, the operation of the compatible optical pickup apparatus when the disk 50 is of the CD format will be described with reference to FIGS. 2 and 5.

Since the optical source 31 and the objective lens 39 are designed for the DVD, the beam reflected from the CD has a spherical aberration. That is, the beam incident on the HOE 43 is an abnormal spherical wave 53 as shown in FIG. 5. The HOE 43 diffracts the incident abnormal spherical wave 53 into the zero-order beam 63 and the positive first-order beam 65. The zero-order beam 63 is a spherical wave 53a like the incident abnormal spherical wave 53. The positive first-order beam 65 is a normal spherical wave 53b which is obtained by offsetting the spherical aberration of the incident spherical wave 53 using a pattern which is formed in the HOE 43 and generates an inverse spherical aberration. The positive first-order beam 65 is incident on the second photodetector 47, and the second photodetector 47 detects a reproduced signal and an error signal. However, since the compatible optical pickup apparatus of the present invention adopts an optical source which emits a short wavelength beam of 650 nm and an objective lens having a numeric aperture of 0.6, the optical spot formed on the disk is smaller than that formed using the conventional optical pickup apparatus (i.e., using the conventional optical source emitting a beam having a wavelength of 780 nm and an objective lens having a numeric aperture of 0.45). Accordingly, any effects due to misfocusing of the beam on the CD are avoided and the signals reproduced from the CD and DVD are of good quality.

Therefore, according to the compatible optical pickup apparatus of the present invention, a hologram optical element is installed between the beam splitter and the photodetector, so that the amount of beam incident on the first and second photodetectors is maintained at about 50% of the initial beam emitted from the optical source. Consequently, the operational current of the optical source can be reduced compared with that of the conventional optical pickup apparatus. Also, the hologram optical element has a pattern for offsetting the spherical aberration, so that information can be accurately reproduced from either the CD or DVD formats.

Another feature of the invention resides in the particular selection of the light source and objective lens combination. That is, in the preferred embodiment the light source and objective lens are optimized for the DVD format, i.e., the location of the focused spot is designed according to the DVD thickness.

What is claimed is:

1. An optical pickup apparatus comprising:
   an optical source;
   a beam splitter for changing the direction of an incident beam;
   an objective lens located between said optical source and a disk for focusing the incident beam to form an optical spot on the disk;
   a photodetector for detecting a data signal and error signals by receiving the beam after it has been reflected from the disk and passed through said beam splitter;
   a hologram optical element (HOE) located between said beam splitter and said photodetector for diffracting the beam reflected from said disk into a zero-order beam and a positive first-order beam;
   wherein said photodetector includes a first photodetector and a second photodetector which receive the zero-order beam and the positive first-order beam, respectively, and wherein one of said first and second photodetectors is used for reproducing a signal from a relatively thin disk and the other of said first and second photodetectors is used for reproducing a signal from a relatively thick disk.

2. An optical pickup apparatus as claimed in claim 1, wherein said hologram optical element has a pattern for forming the positive first-order beam as an abnormal spherical wave having an inverse spherical aberration with respect to the incident beam.

3. An optical pickup apparatus as claimed in claim 1, further comprising a grating which is located on an optical path between said optical source and said beam splitter for diffracting the incident beam.

4. An optical pickup apparatus as claimed in claim 1, further comprising a collimating lens which is located on an optical path between said optical source and said objective lens for collimating an incident divergent beam.

5. An optical pickup apparatus as claimed in claim 1, further comprising an astigmatism lens located between said beam splitter and said photodetector.

6. An optical pickup apparatus as claimed in claim 1, wherein said optical source is a semiconductor laser emitting a beam having a wavelength of about 650 nm and said objective lens has a numeric aperture of about 0.6.

7. An optical pickup apparatus as claimed in claim 1, wherein each of said first and second photodetectors have six divided detection plates.

8. An optical pickup apparatus as claimed in claim 1, wherein said optical source is a semiconductor laser emitting a beam having a wavelength of shorter than about 780 nm and said objective lens has a numeric aperture of larger than about 0.45.

9. An optical pickup apparatus comprising:

an optical source;

a beam splitter for changing the direction of an incident beam;

an objective lens located between said optical source and a disk for focusing the incident beam to form an optical spot on the disk;

a photodetector for detecting a data signal and error signals by receiving the beam after it has been reflected from the disk and passed through said beam splitter;

a hologram optical element (HOE) located between said beam splitter and said photodetector for diffracting the beam reflected from said disk into a zero-order beam and a positive first-order beam;

wherein said photodetector includes a first photodetector and a second photodetector which receive the zero-order beam and the positive first-order beam, respectively, and wherein said first photodetector is used for reproducing a signal from a relatively thin disk and said second photodetector is used for reproducing a signal from a relatively thick disk.

10. An optical pickup apparatus comprising:

an optical source;

a beam splitter for changing the direction of an incident beam;

an objective lens located between said optical source and a disk for focusing the incident beam to form an optical spot on the disk;

a photodetector for detecting a data signal and error signals by receiving the beam after it has been reflected from the disk and passed through said beam splitter;

a hologram optical element (HOE) located between said beam splitter and said photodetector for diffracting the beam reflected from said disk into a zero-order beam and a positive first-order beam;

wherein said photodetector includes a first photodetector and a second photodetector which receive the zero-order beam and the positive first-order beam, respectively; and wherein said hologram optical element has a pattern for forming the positive first-order beam as an abnormal spherical wave having an inverse spherical aberration with respect to the incident beam.

* * * * *